US010363679B2

(12) United States Patent
Julian et al.

(10) Patent No.: US 10,363,679 B2
(45) Date of Patent: Jul. 30, 2019

(54) WATER BEARING AND FOOD CUTTING ASSEMBLY

(71) Applicant: Lamb Weston, Inc., Eagle, ID (US)

(72) Inventors: John C. Julian, Richland, WA (US); Christopher M. Smith, Richland, WA (US); Mark A. Fow, Kennewick, WA (US)

(73) Assignee: Lamb Weston, Inc., Eagle, ID (US)

( * ) Notice: Subject to any disclaimer, the term of this patent is extended or adjusted under 35 U.S.C. 154(b) by 0 days.

(21) Appl. No.: 15/426,520

(22) Filed: Feb. 7, 2017

(65) Prior Publication Data

US 2018/0222076 A1   Aug. 9, 2018

(51) Int. Cl.
 *B26D 3/11* (2006.01)
 *F16C 17/10* (2006.01)
 (Continued)

(52) U.S. Cl.
 CPC .............. *B26D 7/2614* (2013.01); *B26D 1/28* (2013.01); *B26D 3/11* (2013.01); *B26D 7/0658* (2013.01); *F16C 17/10* (2013.01); *F16C 17/26* (2013.01); *F16C 33/1045* (2013.01); *F16C 37/002* (2013.01); *F16C 2322/00* (2013.01)

(58) Field of Classification Search
 CPC .......... F16C 17/04; F16C 17/16; F16C 17/26; F16C 33/1045; F16C 17/14; F16C 32/0629; F16C 33/6692; F16C 35/10; F16C 32/06; F16C 32/064; F16C 32/0696;
 (Continued)

(56) References Cited

U.S. PATENT DOCUMENTS

| 3,610,713 A | 10/1971 | Satterthwaite et al. |
| 4,607,964 A | 8/1986 | Kramer et al. |

(Continued)

FOREIGN PATENT DOCUMENTS

| CN | 102630899 A | 8/2012 |
| WO | 1994006678 | 3/1994 |
| WO | 2004011837 | 2/2004 |

OTHER PUBLICATIONS

International Search Report and Written Opinion dated May 16, 2018.

*Primary Examiner* — Jason Daniel Prone
*Assistant Examiner* — Samuel A Davies
(74) *Attorney, Agent, or Firm* — Ryan T. Grace; Advent, LLP

(57) ABSTRACT

A method for lubricating a radial bearing of a food cutter assembly is disclosed. The method can include receiving a supply of water at a housing for rotationally mounting a spindle body having a rotational axis, where the housing includes a radial bearing proximate to a thrust disc of the spindle body. The thrust disc can include opposing surfaces extending radially from the rotational axis of the spindle body and a circumferential surface between the opposing surfaces. The water can be directed through fluid passages extending from a port in the housing through the radial bearing to the spindle body and across the opposing surfaces and the circumferential surface to the spindle body. The spindle body may be rotated while the water is directed through the fluid passages to create a water film between the housing and the spindle body that reduces friction between the housing and the spindle body.

17 Claims, 5 Drawing Sheets

(51) Int. Cl.
    *B26D 7/26*     (2006.01)
    *B26D 7/06*     (2006.01)
    *B26D 1/28*     (2006.01)
    *F16C 33/10*     (2006.01)
    *F16C 17/26*     (2006.01)
    *F16C 37/00*     (2006.01)

(58) Field of Classification Search
    CPC . F16C 2322/00; B26D 7/0658; B26D 7/2614; B26D 3/11; B26D 7/265
    USPC .......................... 384/100, 107, 420; 83/402
    See application file for complete search history.

(56) References Cited

U.S. PATENT DOCUMENTS

| | | | |
|---|---|---|---|
| 4,644,838 A | | 2/1987 | Samson et al. |
| 4,884,899 A | * | 12/1989 | Schwartzman ......... F16C 17/10 |
| | | | 384/100 |
| 5,168,784 A | | 12/1992 | Foster et al. |
| 5,179,881 A | | 1/1993 | Frey et al. |
| 5,394,793 A | * | 3/1995 | Julian ...................... B26D 3/11 |
| | | | 83/402 |
| 9,032,892 B2 | | 5/2015 | Colquhoun |
| 2015/0292555 A1 | * | 10/2015 | Quappen ................. F16G 15/08 |
| | | | 384/99 |

* cited by examiner

WATER BEARING AND FOOD CUTTING ASSEMBLY

BACKGROUND

An increasing number of food products are processed before arriving on a consumer's plate. A variety of fruits and vegetables, for example, are cut or shaped and then frozen or otherwise preserved for later use. In order to meet the demand for processed food products and efficiently produce large quantities of such products, the food industry utilizes various equipment for rapidly processing large amounts of foodstuff.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure can relate to a food cutter assembly. The food cutter assembly can include a spindle body defining an interior passage for receiving a food product. The food cutter assembly can also include a thrust disc connected to the spindle body. The thrust disc can include opposing surfaces extending radially from the rotational axis of the spindle body and a surface between the opposing surfaces. A cutting tool can be connected to the spindle body for cutting the food product. The food cutter assembly can also include a housing for rotationally mounting the spindle body, where the housing includes a radial bearing to be positioned proximate to the thrust disc. The spindle body and the housing can define fluid passages extending from a port in the housing through the radial bearing to the spindle body and across the opposing surfaces and the circumferential surface to the spindle body.

Aspects of the disclosure can also relate to a method for lubricating a radial bearing of a food cutter assembly. The method can include receiving a supply of water at a housing for rotationally mounting a spindle body having a rotational axis, where the housing includes a radial bearing proximate to a thrust disc of the spindle body. The thrust disc can include opposing surfaces extending radially from the rotational axis of the spindle body and a circumferential surface between the opposing surfaces. The water can be directed through fluid passages extending from a port in the housing through the radial bearing to the spindle body and across the opposing surfaces and the circumferential surface to the spindle body. The spindle body may be rotated while the water is directed through the fluid passages to create a water film between the housing and the spindle body that reduces friction between the housing and the spindle body.

DRAWINGS

The Detailed Description is described with reference to the accompanying figures.

FIG. 1 is an isometric view illustrating a food cutter assembly including a housing with radial bearings for rotationally mounting a spindle body, the spindle body having thrust discs and a cutting tool connected to an end of the spindle body, and a sprocket fixedly connected to the spindle body to be driven by a belt, where a water film can be created between the housing and the spindle body to reduce friction between the housing and the spindle body in accordance with an example embodiment of the present disclosure.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be embodied as formulations, food products, processes, processes for making food products, and processes for making formulations. The following detailed description is, therefore, not to be taken in a limiting sense.

Equipment for processing foodstuff can include bearings. The bearings can be lubricated by an oil or gel. In some instances, a portion of the oil or gel used to lubricate the bearings can seep into the food product flow stream, possibly contaminating the food product. Additionally, the lubricant can heat up due to the relative motion of the components and can deteriorate over time. This can result in interruptions where the system needs to cool down or where the lubricant needs to be flushed from the system and changed.

Figure 1:
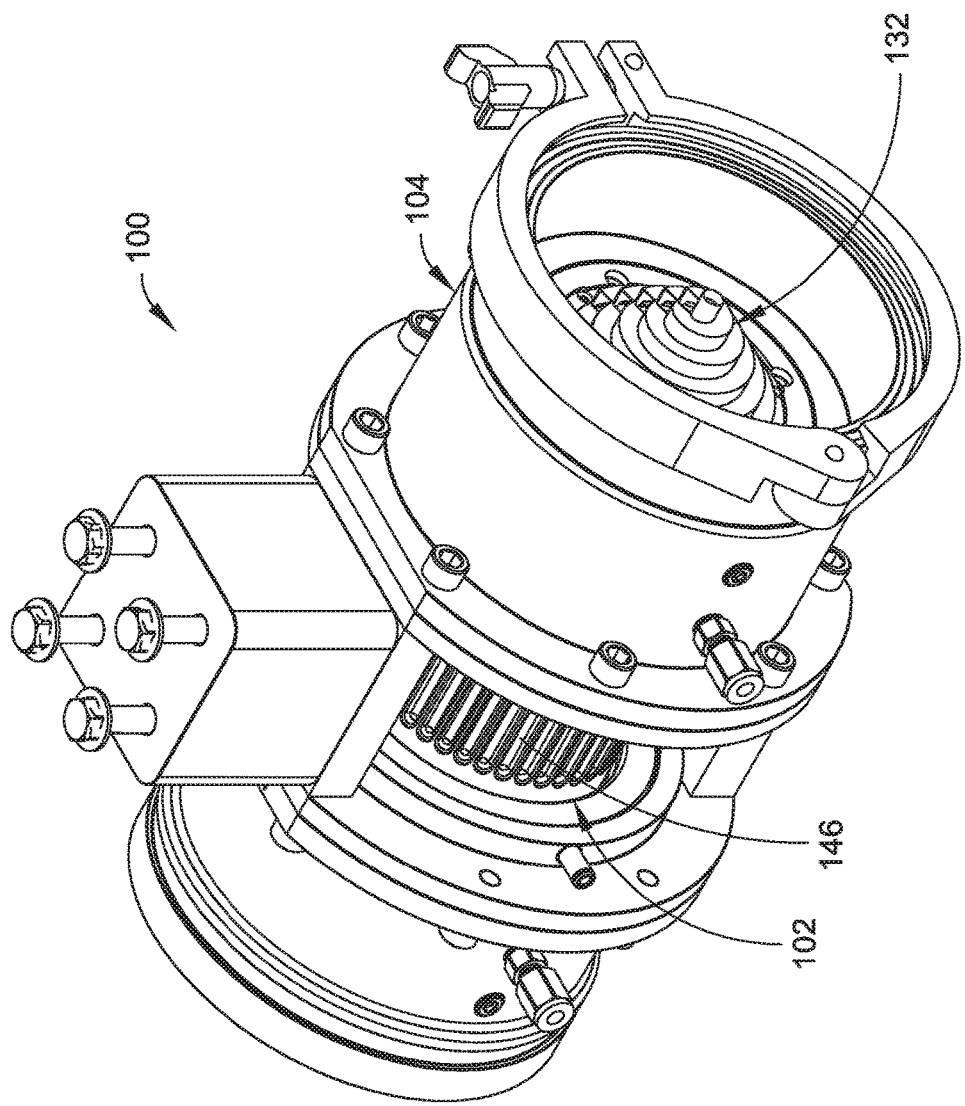
Figure 2:
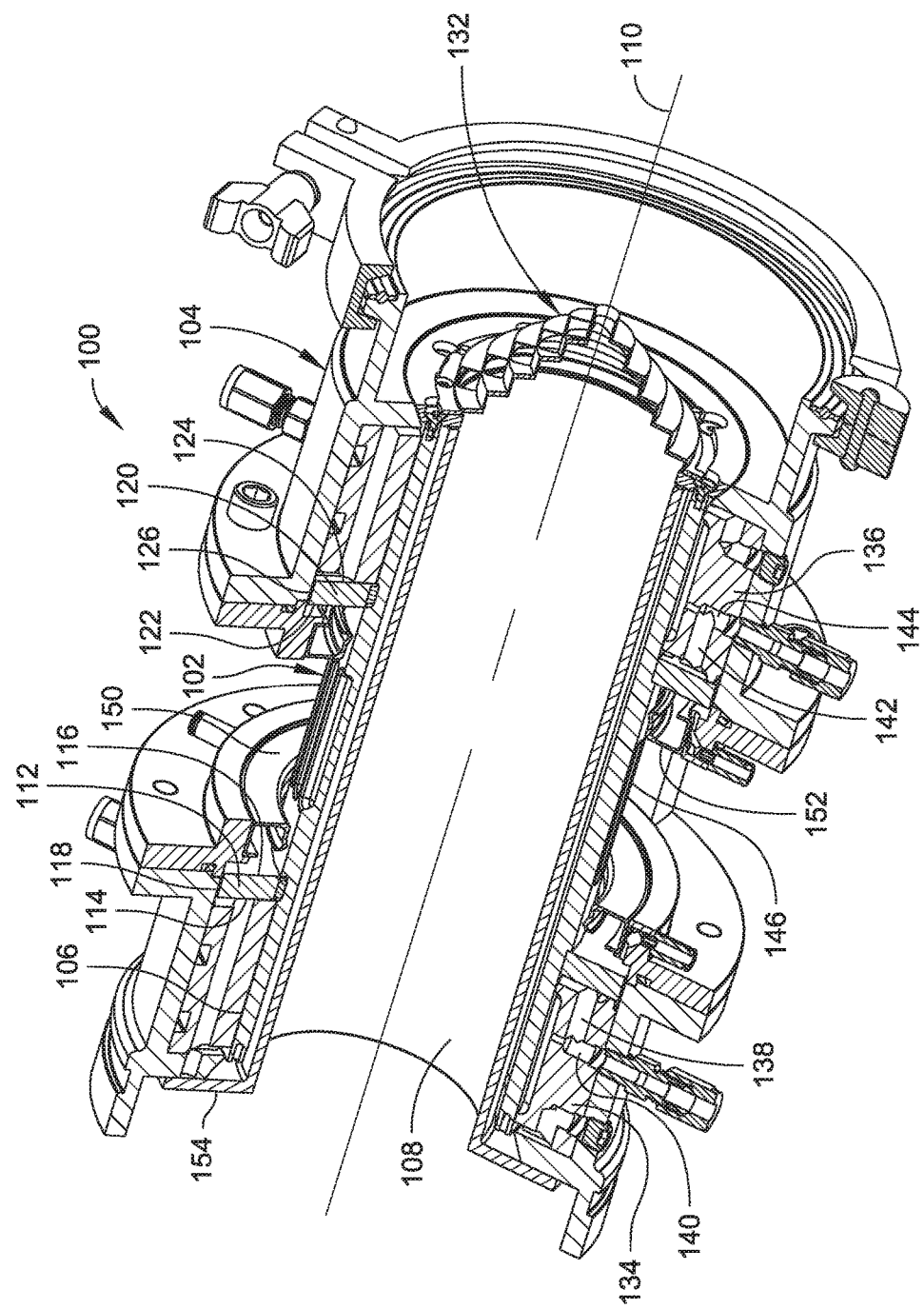
FIG. 2 is a cross-sectional isometric view of the food cutter assembly illustrated in FIG. 1.
Figure 3:
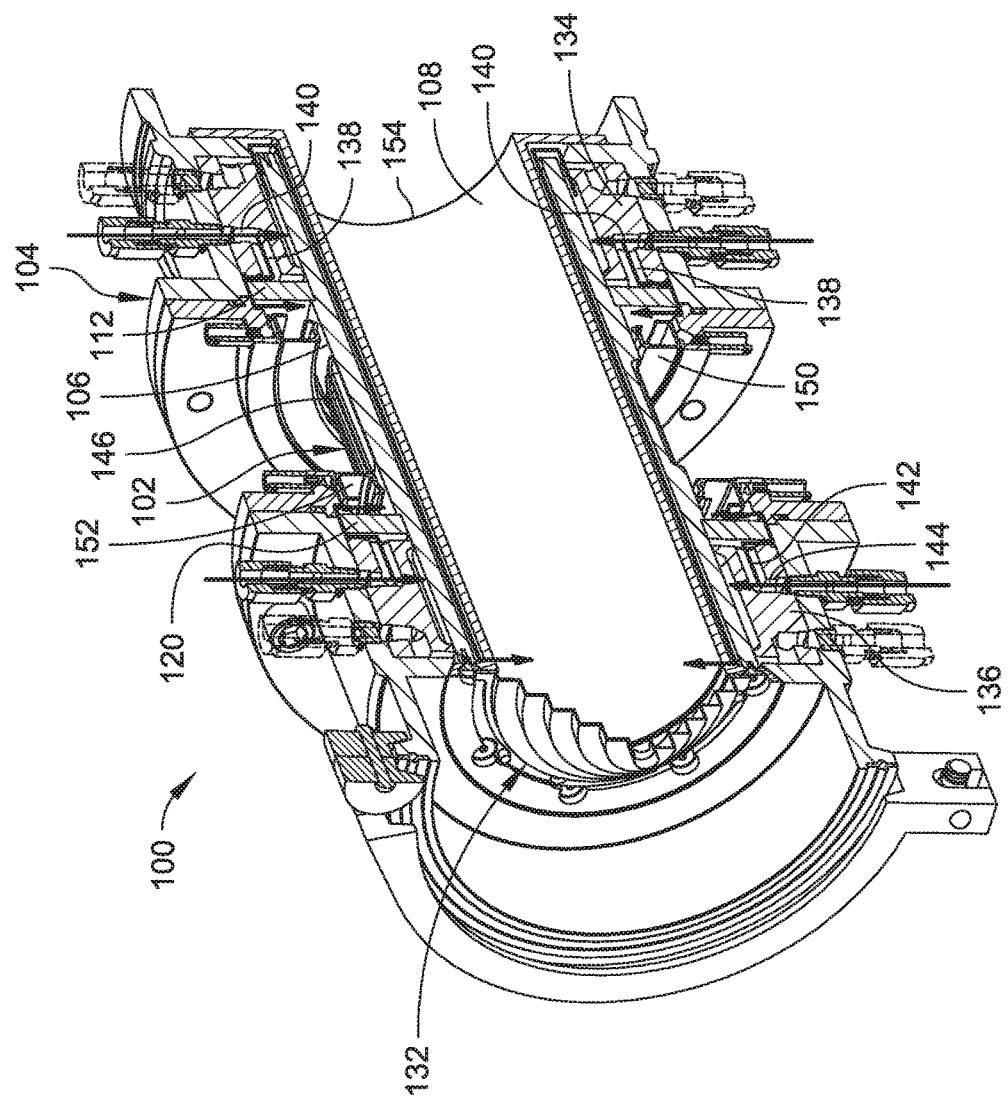
FIG. 3 is another cross-sectional isometric view of the food cutter assembly illustrated in FIG. 1.
Figure 4:
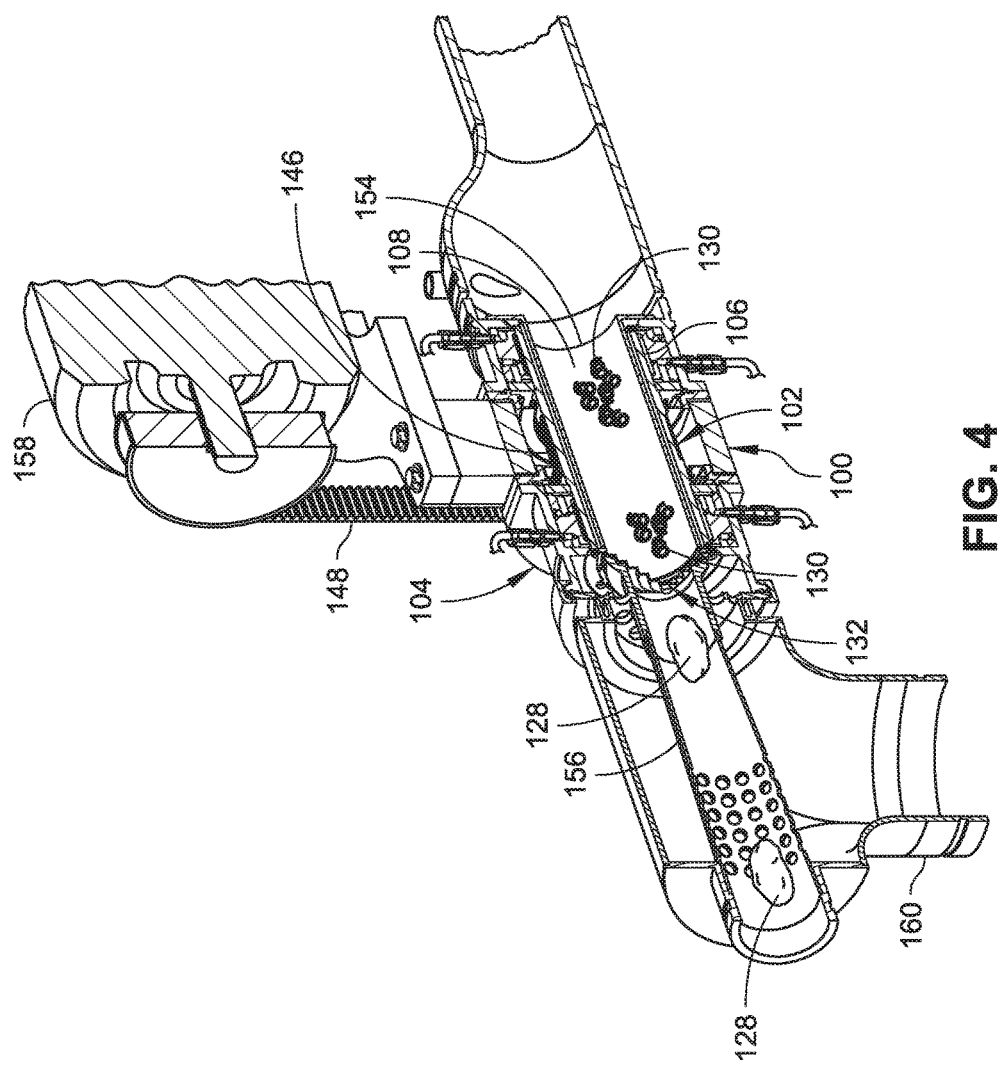
FIG. 4 is a cross-sectional isometric view of a food cutter assembly, such as the food cutter assembly illustrated in FIG. 1, where the food cutter assembly is used to cut food products carried into the food cutter assembly in a product flow in accordance with an example embodiment of the present disclosure.

FIGS. 1 through 4 illustrate a food cutter assembly 100 in accordance with embodiments of this disclosure. The features associated with the food cutter assembly 100 eliminate the risk of contaminating the assembly and reduces down time for the assembly. In FIG. 1, the food cutter assembly is shown to include a housing 104 for a spindle 102 having a cutting tool 132 coupled to an end of the spindle 102 for processing food product 128 supplied to the food cutter assembly 100 by a food product processing path (e.g., as shown in FIG. 4). Even though the specification discusses potatoes as food product 128, other food products can be cut with cutting tool 132. For example, food product 128 can include all types of potatoes, sweet potatoes yams, apples, pears, carrots and other types of fruits and vegetables with similar flesh density. In some situations, food product 128 and be a frozen and/or chilled food product to provide a proper hardness for cutting. The spindle 102 can be rotated by a sprocket 146 formed around the spindle 102 to be driven by a belt 148. For example, FIG. 4 shows an embodiment of the food cutter assembly 100 implemented in a food product processing path with a motor 158 that drives the belt 148 to turn the sprocket 146.

FIGS. 2 and 3 show cross-sectional isometric views of the food cutter assembly 100. In embodiments the food cutter assembly 100 may include one or more radial bearings (e.g., a first radial bearing 134 and a second radial bearing 136) for rotationally mounting a spindle body 106 of the spindle 102. The spindle body 106 may be fixedly connected with one or more thrust discs (e.g. a first thrust disc 112 and a second thrust disc 120) that reduce or eliminate contact between the spindle body 106 and the housing 104. For example, the one or more thrust discs may be connected to the spindle body 106 by an interference fit, where the one or more discs are heated and the spindle is cooled while the components are fit together so that they tighten up as they return to their previous temperatures. In some embodiments, the thrust discs may be formed of stainless steel. In some embodiments, the first thrust disc 112 has first opposing surfaces 114 and 116 and a first circumferential surface 118, and the second thrust disc 120 has second opposing surfaces 122 and 124 and a second circumferential surface 126. For example, the first thrust disc 112 can include first opposing surfaces 114 and 116 that extend radially from a rotational axis 110 of the spindle body 106, and the first circumferential surface 118 can be located between the first opposing surfaces 114 and 116. The second thrust disc 120 (and possibly other thrust discs) can be similarly structured.

The first radial bearing 134 can be positioned proximate to the first thrust disc 112, and the second radial bearing 136 can be positioned proximate to the second thrust disc 120 when the spindle body 106 is rotationally mounted to the housing 104. In some embodiments, the first radial bearing 134 and the second radial bearing 136 are formed of a food grade plastic (e.g., Nylon 6, high density polyethylene, polyethylene terephthalate, or the like). The spindle body 106 and the housing 104 can define one or more fluid passages in between components of the food cutter assembly 100 that move relative to one another. For example, the spindle body 106 and the housing 104 can define first fluid passages 138 extending from a first port 140 in the housing through the first radial bearing 134 to the spindle body 106 and across the first opposing surfaces 114 and 116 and the first circumferential surface 118 to the spindle body 106. The spindle body 106 and the housing 104 can also define second fluid passages 142 extending from a second port 144 in the housing 104 through the second radial bearing 136 to the spindle body 106 and across the second opposing surfaces 122 and 124 and the second circumferential surface 126 to the spindle body 106.

Although, first and second bearings and first and second thrust discs are shown in FIGS. 2 and 3, in other embodiments, the food cutter assembly 100 may include a single bearing or thrust disc, or more than two bearings or thrust discs. In the illustrated embodiment, first and second bearings and thrust discs are arranged on either side of the sprocket 146. This configuration may provide improved balance and allow the spindle 102 smoothly when the sprocket is driven by the belt 148.

In embodiments, a cutting tool 132 is connected to an end of the spindle body 106 for processing (e.g., cutting or slicing) food product 128 received at the food cutter assembly 100. For example, the cutting tool 132 can include a plurality a helical knife having one or more helical or spiral shaped blades for shaping food product 128 into cut food product segments 130 (e.g. spiral cut shapes and other shapes). In some embodiments, the cutting tool 132 may include a pulverizer or any other rotationally driven food processing element.

In operation, the spindle body 106 may be rotated by the sprocket 146 that is fixedly connected to the spindle body 106 and driven by the belt 148 (e.g., as shown in FIG. 4), whereby the spindle's movement causes the cutting tool 132 to rotate about a rotational axis 110 that is aligned with a processing path of the food product 128. The spindle body 106 can also define an interior passage 108 extending along the rotational axis 110. The interior passage 108 can receive the cut food product segments 130 from the cutting tool 132. In some embodiments, a tube 154 is located in the interior passage along the length of the spindle body 106 for receiving the cut food product segments 130 and transporting the cut food product segments 130 to another portion of the food product processing path. For example, the tube 154 can transport the cut food product segments 130 to another food processing device or station, or to a storage container. The spindle body 106 can rotate around the tube 154, which can be stationary relative to the food product processing path. The tub 154 may be configured to fixedly connect to the housing 104 and extend into the spindle body 106 to receive the cut food product segments 130 from the cutting tool 132. In this regard, the tube 154 may also serve to protect the cut food product segments 130 from being damaged or broken down further by the rotating spindle body 106. In some embodiments, the spindle body 106 and/or the tube 154 can be formed of a food grade plastic material.

Water (or another food safe fluid) can be pumped through the fluid passages 138 and 142 to create a water film between the housing 104 and the spindle body 106, where the water film serves to reduce friction between the housing 104 and the spindle body 106 while the spindle 102 is being rotated. For example, arrows in FIG. 3 illustrate the water flow through fluid passages 138 and 142. In some embodiments, fresh water can be supplied for the fluid passages 138 and 142 from a water source (e.g., a city water tap). Water for the fluid passages 138 and 142 may be suppled from the water source at a water pressure in the range of approximately 40 psi to 80 psi, for example the water may be supplied at approximately 60 psi. In some cases, keeping the water pressure above approximately 40 psi may avoid bacteria or mold build up. Using water as a lubricant for the food cutter assembly 100 can reduce the risk of contaminating or otherwise negatively impacting the food product 128 during its processing. For example, food safe oils can be used to lubricate processing components; however, these can seep into the food product processing stream and end up the processed food product 128 (e.g., in the cut food product segments 130). The food cutter assembly 100 described herein can be lubricated with water that is pumped through the fluid passages 138 and 142, thus the seepage of lubricant (i.e., the water) into the food product processing stream has no negative impact on the food product 128, which is already being driven through the food product processing path by water.

The food cutter assembly 100 can include respective seals (e.g., a first seal 150 and a second seal 152) for each of the first and second radial bearings 134 and 136 to keep the water from leaking out of the first and second radial bearings 134 and 136, and to maintain the water at a pressure sufficient to create a film that lubricates the spindle body 106 and thrust discs 112 and 120 as they rotate relative to the housing 104. In some embodiments, the first seal 150 is adjacent to the first thrust disc 112 and the second seal 152 is adjacent to the second thrust disc 120 with the sprocket 146 disposed between the first seal 150 and the second seal 152. The first and second seals 150 and 152 may have seal ports (not shown) that allow the water to exit in a controlled fashion from the fluid passages 138 and 142 so that fresh water can be continuously supplied. The water can serve a variety of purposes. For example, in addition to reducing friction between the spindle body 106 and the housing 104, the water pumped through the fluid passages can cool the food cutter assembly 100 and prevent accumulation of debris (e.g., starch) from the food product 128 in spaces between the spindle body 106 and the tube 154.

In some embodiments, the spindle body 106 and the tube 154 define an opening at a first end (e.g., opposite the cutting tool 132) that allows water to enter between the spindle body 106 and the tube 154, thereby creating a film between the spindle body 106 and the tube 154 to reduce friction between the two components. In some embodiments, the separation (or play) between the spindle body 106 and the tube 154 can be in the range of 5 to 30 one thousandths of an inch (0.005 to 0.030 in.), for example the spindle body 106 and the tube 154 can have a separation tolerance of approximately 10 to 15 one thousandths of an inch (0.010 to 0.015 in.). In some embodiments, the separation (or play) at the opening at the first end, where water can enter the space between the spindle body 106 and the tube 154, may be in the range of 10 to 30 one thousandths of an inch (0.010 to 0.030 in.), for example the play between ends of the spindle body 106 and the tube 154 that form the opening may approximately 15 one thousandths of an inch (0.015 in.). In some embodiments, the spindle body 106 and the tube 154 can also have an opening at a second end (e.g., proximate to the cutting tool 132) that allows water to exit from between the spindle body 106 and the tube 154 and enter the tube 154. The water can serve to reduce friction between the spindle body 106 and the tube 154, and the water can also serve to clean out the space between the spindle body 106 and the tube 154 and/or the inner surface of the tube 154.

FIG. 4 shows an embodiment of the food cutter assembly 100 implemented in a food product processing path with a motor 158 that drives the belt 148 to turn the sprocket 146. The motion of the belt 148 causes the spindle 102 to rotate and spin the cutting tool 132 at the end of the spindle 102. In some embodiments, the motor 158 is a 10 horsepower (hp), 3600 revolution per minute (rpm) motor; however, any motor with sufficient horsepower and torque can be utilized. The requisite horsepower and torque may depend on the food product 128, cutting tool 132, and so forth. In some embodiments, the sprocket 146, belt 148, and motor 158 are configured to rotate the spindle 102 at a rate in the range of approximately 3000 to 6000 rpm, for example, the spindle 102 may be driven to rotate at a rate of approximately 4500 rpm. Meanwhile, the food product 128 can be fed into the food cutter assembly 100 (e.g., through the cutting tool 132) via one or more supply tubes, where the food product is transported through the tubes by flowing water. In some embodiments, the water flow rate through the one or more supply tubes is in the range of approximately 400 to 700 gallons per minute, or any flow rate sufficient for driving the food product 128 through the one or more supply tubes at a sufficient speed for the food cutter assembly 100 to process the food product 128. The one or more supply tubes can include a perforated tube 156 that directs the food product 128 into the food cutter assembly 100. In some embodiments, the perforated tube 156 may include a tapered portion that aligns the food product 128 with the cutting tool 132 of the food cutter assembly 100. A portion of the water used to transport the food product 128 may be shed through openings in the perforated tube 156 through a bypass tube 160 and drained out of the system, while some of the water may enter the interior passage of the spindle body 106 (e.g., into tube 154) through the cutting tool 132.

Figure 5:
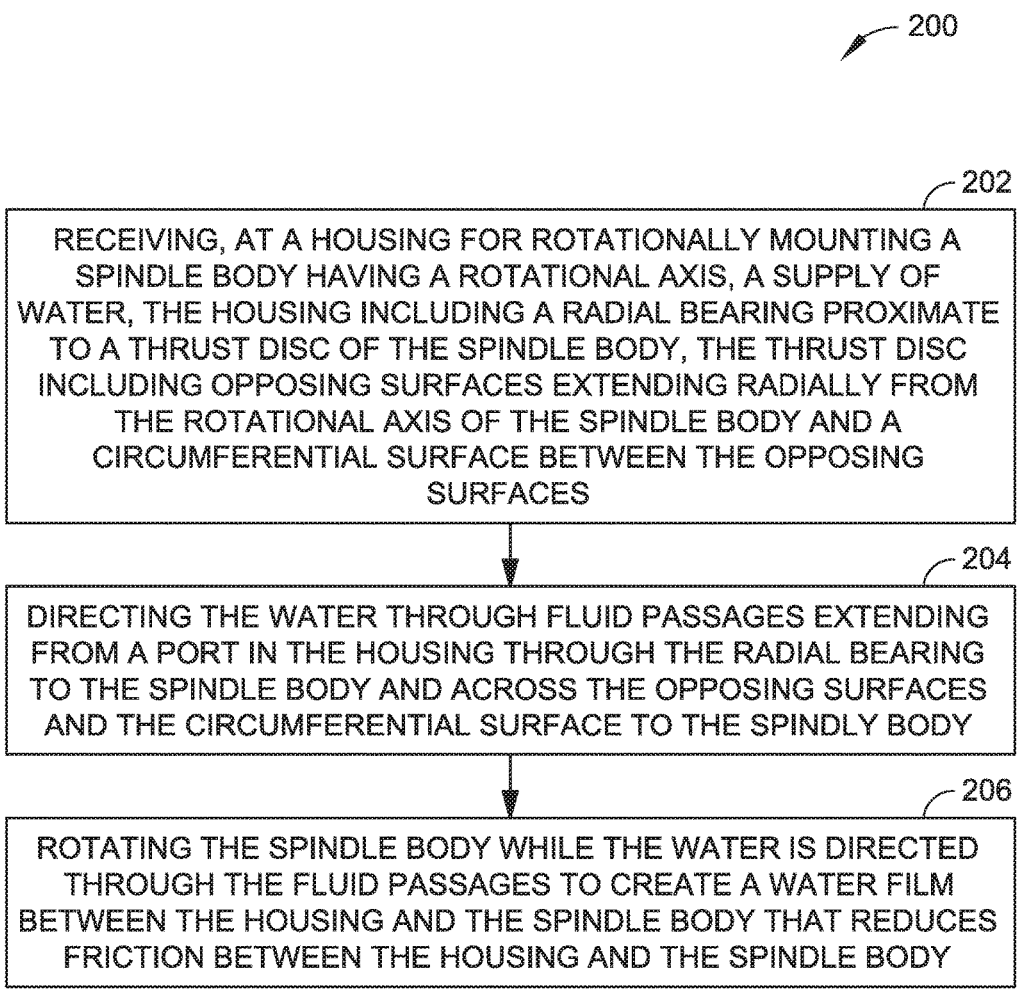
FIG. 5 is a flow diagram illustrating a process associated with a food cutter assembly, such as the food cutter assembly illustrated in FIG. 1, where a water film can be created between the housing and the spindle body to reduce friction between the housing and the spindle body in accordance with an example embodiment of the present disclosure.

FIG. 5 is a flow chart illustrating a method 200 for supplying a food safe fluid, such as water, to lubricate one or more radial bearings of a food cutter assembly, such as the food cutter assembly 100 described herein. In some implementations, the method 200 can include the following blocks. The method 200 can also include one or more operations or blocks relating to aspects or features of the food cutter assembly 100 described herein. At block 202, the method 200 can include receiving a supply of water at the housing 104 for rotationally mounting the spindle body 106 having rotational axis 110, where the housing 104 includes one or more radial bearings (e.g., first radial bearing 134 and/or second radial bearing 136) proximate to one or more thrust discs (e.g., first thrust disc 112 and/or second thrust disc 120) of the spindle body 106. At block 204, the water can be directed through fluid passages (e.g., first fluid passages 138 and/or second fluid passages 142) extending from one or more respective ports (e.g., first port 140 and/or second port 144) in the housing 104 through the one or more radial bearings to the spindle body 106 and across the opposing surfaces (e.g., first opposing surfaces 114 and 116 and/or second opposing surfaces 122 and 124) and the circumferential surface (e.g., first circumferential surface 118 and/or second circumferential surface 126) of each of the one or more radial bearings to the spindle body 106. At block 206, the spindle body 106 may be rotated while the water is directed through the fluid passages to create a water film between the housing 104 and the spindle body 106 that reduces friction between the housing 104 and the spindle body 106. In some implementations, the water directed through the fluid passages may also cool the housing 104 and the spindle body 106 and/or other portions of the food cutter assembly 100.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, at a housing for rotationally mounting a spindle body having a rotational axis, a supply of water, the housing including a first radial bearing proximate to a first thrust disc of the spindle body and a second radial bearing proximate to a second thrust disc of the spindle body, the first thrust disc including first opposing surfaces extending radially from the rotational axis of the spindle body and a first circumferential surface between the first opposing surfaces, and the second thrust disc including second opposing surfaces extending radially from the rotational axis of the spindle body and a second circumferential surface between the second opposing surfaces, and the spindle body having an interior passage extending along its rotational axis and a tube within the interior passage, around which the spindle body rotates;
   directing the water through first fluid passages extending from a first port in the housing through the first radial bearing to the spindle body and across the first opposing surfaces and the first circumferential surface to the spindle body, and through second fluid passages extending from a second port in the housing through the second radial bearing to the spindle body and across the second opposing surfaces and the second circumferential surface to the spindle body, and through a third fluid passage between the spindle body and the tube;

rotating the spindle body while the water is directed through the first fluid passages and the second fluid passages and the third fluid passage to create a water film between the housing and the spindle body and between the spindle body and the tube that reduces friction between the housing and the spindle body and the tube; and cooling the housing and the spindle body and the tube with the water.

2. The method as recited in claim 1, wherein the spindle body is formed of a food grade plastic material.

3. The method as recited in claim 1, wherein at least one of the first thrust disc or the second thrust disc is fixedly connected to the spindle body.

4. The method as recited in claim 1, wherein a cutting tool is connected to an end of the spindle body for cutting the food product, and the tube is configured to receive the food product.

5. The method as recited in claim 1, wherein the spindle body comprises a sprocket, and rotating the spindle body comprises driving the sprocket with a belt.

6. A method comprising:

receiving, at a housing for rotationally mounting a spindle body having a rotational axis, a supply of water, the housing including a first radial bearing proximate to a first thrust disc of the spindle body and a second radial bearing proximate to a second thrust disc of the spindle body, the first thrust disc including first opposing surfaces extending radially from the rotational axis of the spindle body and a first circumferential surface between the first opposing surfaces, and the second thrust disc including second opposing surfaces extending radially from the rotational axis of the spindle body and a second circumferential surface between the second opposing surfaces, and the spindle body having an interior passage extending along its rotational axis and a tube within the interior passage, around which the spindle body rotates;

directing the water through first fluid passages extending from a first port in the housing through the first radial bearing to the spindle body and across the first opposing surfaces and the first circumferential surface to the spindle body, and through second fluid passages extending from a second port in the housing through the second radial bearing to the spindle body and across the second opposing surfaces and the second circumferential surface to the spindle body, and through a third fluid passage between the spindle body and the tube; and rotating the spindle body while the water is directed through the first fluid passages and the second fluid passages and the third fluid passage to create a water film between the housing and the spindle body and between the spindle body and the tube that reduces friction between the housing and the spindle body and the tube.

7. The method as recited in claim 6, further comprising cooling the housing and the spindle body and the tube with the water.

8. The method as recited in claim 6, wherein the spindle body is formed of a food grade plastic material.

9. The method as recited in claim 6, wherein at least one of the first thrust disc or the second thrust disc is fixedly connected to the spindle body.

10. The method as recited in claim 6, wherein a cutting tool is connected to an end of the spindle body for cutting the food product, and the tube is configured to receive the food product.

11. The method as recited in claim 6, wherein the spindle body comprises a sprocket, and rotating the spindle body comprises driving the sprocket with a belt.

12. A method comprising:

receiving, at a housing for rotationally mounting a spindle body having a rotational axis, a supply of water, the housing including a radial bearing proximate to a thrust disc of the spindle body, the thrust disc including opposing surfaces extending radially from the rotational axis of the spindle body and a circumferential surface between the opposing surfaces and the spindle body having an interior passage extending along its rotational axis and a tube within the interior passage, around which the spindle body rotates;

directing the water through fluid passages extending from a port in the housing through the radial bearing to the spindle body and across the opposing surfaces and the circumferential surface to the spindle body, and through another fluid passage between the spindle body and the tube; and rotating the spindle body while the water is directed through the fluid passages to create a water film between the housing and the spindle body and between the spindle body and the tube that reduces friction between the housing and the spindle body and the tube.

13. The method as recited in claim 12, further comprising cooling the housing and the spindle body and the tube with the water.

14. The method as recited in claim 12, wherein the spindle body is formed of a food grade plastic material.

15. The method as recited in claim 12, wherein the thrust disc is fixedly connected to the spindle body.

16. The method as recited in claim 12, wherein a cutting tool is connected to an end of the spindle body for cutting the food product, and the interior passage is configured to receive the food product.

17. The method as recited in claim 12, wherein the spindle body comprises a sprocket, and rotating the spindle body comprises driving the sprocket with a belt.

* * * * *